United States Patent [19]

Pridham

[11] Patent Number: 4,697,254

[45] Date of Patent: Sep. 29, 1987

[54] SYSTEM AND METHOD FOR MEASURING ICE THICKNESS

[75] Inventor: Roger G. Pridham, Providence, R.I.

[73] Assignee: Raytheon Company, Lexington, Mass.

[21] Appl. No.: 869,644

[22] Filed: Jun. 2, 1986

[51] Int. Cl.$^4$ ............................ G01S 9/66; G01S 9/68
[52] U.S. Cl. ........................................ 367/92; 367/101
[58] Field of Search ..................... 367/92, 101; 73/590

[56] References Cited

U.S. PATENT DOCUMENTS 3,267,416  8/1966  Morse .................................. 367/101
3,786,405  1/1974  Chramiec et al. ..................... 367/92

Primary Examiner—Thomas H. Tarcza
Assistant Examiner—Daniel T. Pihulic
Attorney, Agent, or Firm—Martin M. Santa; Richard M. Sharkansky

[57] ABSTRACT

Sonar ice thickness measurement comprises transmitting an AM and subsequent CW sonic radiant energy signals from the water toward the sonic signal reflecting ice cap. Reflection of the CW signal from the water-ice interface and reflection from the water-air interface of the modulating frequency, generated by non-linear or parametric effects in the water by the modulated transmit signal, causes the CW signal to be modulated to generate side bands at the modulating frequency on each side of the carrier frequency to provide an FM high frequency signal. Detection of the FM signal determines the time of arrival of the echo of said detected FM signal relative to the detection of the reflected modulated signal from the water-ice interface.

11 Claims, 3 Drawing Figures

4,697,254

SYSTEM AND METHOD FOR MEASURING ICE THICKNESS

BACKGROUND OF THE INVENTION

This invention relates to apparatus and method for measuring ice thickness and more particularly to a measurement of ice thickness using sonar located in the water under the ice layer.

There exists a need to know the thickness of the ice cap in many applications where the thickness of the ice cap determines the limits at which certain equipment will function. One of these applications involves submarine operations where a submarine is in water covered by an ice cap. In order to prevent damage to the submarine when surfacing is desired, it is necessary that the thickness of the ice cap be known before surfacing is attempted. If the ice cap is thicker than a prescribed thickness, the submarine will be unable to break the ice cap and the impact may cause damage to the submarine or its contents because of the severity of the impact with ice which is too thick to crack.

Therefore, it is necessary that an accurate determination of the thickness of the ice cap be made prior to attempting to break through the ice cap.

SUMMARY OF THE INVENTION

The foregoing problems of prior art techniques for measuring ice thickness are overcome and other objects and advantages of sonar ice thickness measuring equipment are provided by a system in accordance with this invention which comprises means for transmitting sonic radiant energy signals from the water environment beneath the ice cap toward the sonic signal reflecting ice cap. Means for modulating the transmit signal to provide an amplitude modulated transmit signal, upon termination of a modulating signal the unmodulated carrier continues to transmit a signal to the ice cap. Reflection of the unmodulated carrier from the water-ice interface together with the modulating frequency, generated by non-linear or parametric effects in the water by the modulated transmit signal, which has been reflected from the water-air interface causes the unmodulated CW carrier to be modulated to generate side bands at the modulating frequency on each side of the carrier frequency to provide a frequency modulated high frequency carrier, and finally means detecting said frequency modulated carrier frequency to determine the time of arrival of the echo of said detected FM signal relative to the detection of the reflected modulated signal from the water-ice interface.

The aforementioned features of the invention are explained in the following description taken in conjunction with the accompanying drawings wherein.

DESCRIPTION OF THE PREFERRED EMBODIMENT

This invention utilizes a parametric transmitting array and a parametric receiving array to measure ice thickness using a single high frequency transducer. The invention is described in terms of an extension of a high frequency sonar system 1 used in a submarine top sounder mode which is used for navigation under an ice cap to encompass an additional function of providing a measurement of ice thickness. This invention describes a sonar system useful for measuring ice thickness where the top sounding sensors 11 on a submarine are of the type where the sensors have significant response for both transmitting and receiving only at high frequencies, e.g., greater than 150 KHz. Sound attenuates rapidly in ice at these frequencies. It is therefore desirable to operate around 10 KHz to get significant penetration through the ice whereby the echo from the air-ice interface can be detected. The parametric transmitting array technique for the generation of a low frequency signal from the nonlinear interaction of two higher frequencies having a frequency difference equal to that of the low frequency signal is well known to those skilled in the art. This technique of generating a low frequency signal can be applied in using the top sounding transducers for generating a low frequency 10 KHz transmission signal which can penetrate the ice cap. Ice thickness is estimated by dividing the measured one-way travel time through the ice by the estimated sound speed in ice.

Figure 1:
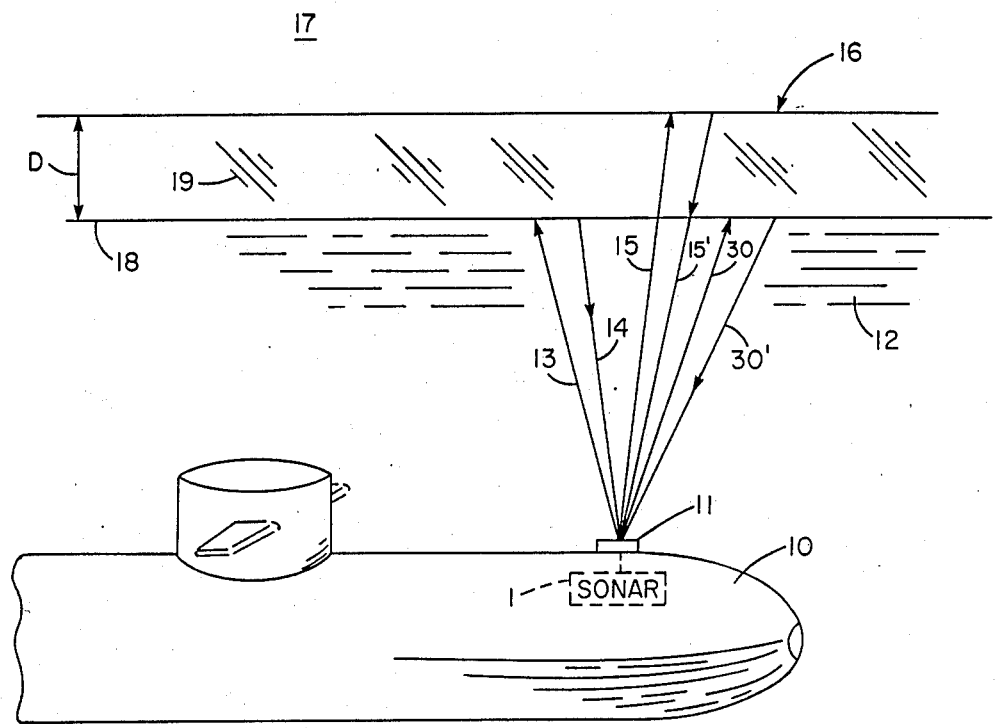
FIG. 1 is a pictorial view showing the invention being used to measure ice thickness.

Referring to FIG. 1, there is shown a submarine 10 carrying a top-sounding high-frequency type transducer 11 both of which are immersed in a sea water 12 environment. A transmitted signal 13 is shown striking the bottom 18 of the ice cap 19 from which the reflected signal 14 is received by the transducer 11. The travel time of the transmitted signal 13 as determined by the reflected signal 14 gives the depth of the submarine 10 below the bottom 18 of the ice cap. The signal 13 is a high frequency carrier amplitude modulated with a low frequency signal which will penetrate the ice cap. The ice cap-water interface 18 is clearly defined by the backscatter of the high frequency carrier of signal 13. On the other hand, a nonlinearly (or parametrically) generated difference frequency 15 (10 KHz in the example) is generated by the transmitted signal 13 in the interaction region of the sea water 12 which extends from the top sounder projector transducer 11 up to the ice cap 19 (an interaction region of about 100 meters is adequate to produce sufficient amplitude of the difference frequency to be detectable). The 10 KHz difference frequency 15 propagates into the ice cap 19 and is reflected off the upper boundary (i.e. the air 17-ice 19 interface 16). The 10 KHz difference frequency 15' which is reflected off the upper boundary 16 propagates through the ice cap 19 and the water 12 back to the high frequency transducer 11.

Figure 2:
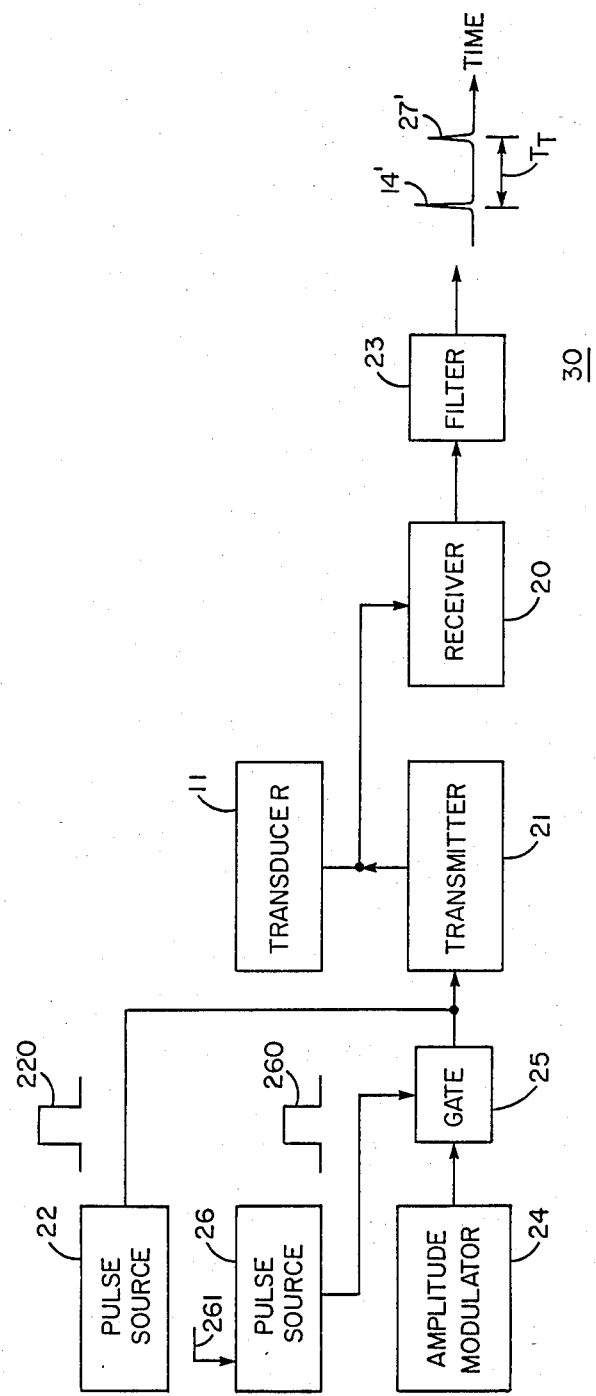
FIG. 2 is a circuit block diagram of the invention.

Detection of the low frequency 10 KHz reflected signal 15' using the high frequency transducer 11 is accomplished by following the high frequency amplitude modulated carrier 13 with a longer duration continuous wave transmission 30 at a high unmodulated carrier frequency. This high carrier frequency need not be the same as that used for the initial transmission 13. This second transmission frequency 30 is not modulated so that no difference frequency components are generated in its travel through the water 12 from the transducer 11 to the ice cap-water interface 18. However, the transmitted unmodulated carrier frequency 30 is scattered from the water-ice interface 18 back to the top sounder sensor transducer 11 which is also used as the projector. This reflected high frequency CW signal 30' propagates back to the projector along with the 10 KHz difference frequency components 15' provided by the preceding 10 KHz amplitude modulated carrier frequency that are scattered by the ice 19 volume and the air-ice interface 16. The 10 KHz difference frequency components 15' and the unmodulated carrier frequency 30' interact nonlinearly in the water in such a way as to generate sidebands at 10 KHz on each side of the high frequency carrier 30'. These sidebands arise because the nonlinear effect manifests itself as a frequency modulation of the backscattered carrier components by the backscattered 10 KHz components. This frequency modulated high frequency carrier is received by the high frequency top sounder transducer 11 and processed by FM discrimination techniques in an FM receiver to provide an echo signal from the air-ice interface 16. If the ice thickness, determined by the sensitivity of the ice thickness measuring system 30 of FIG. 2, is less than some maximum thickness, for example, a thickness of 5 feet, a discernible echo signal 27' will be detected by the FM receiver 20 from the ice-air interface 16. A very thick ice cap, where submarine surfacing is not possible, can be identified by lack of a detected echo from the ice-air interface 16 because of the attenuation of the modulating frequency 15 in the ice.

Figure 3:
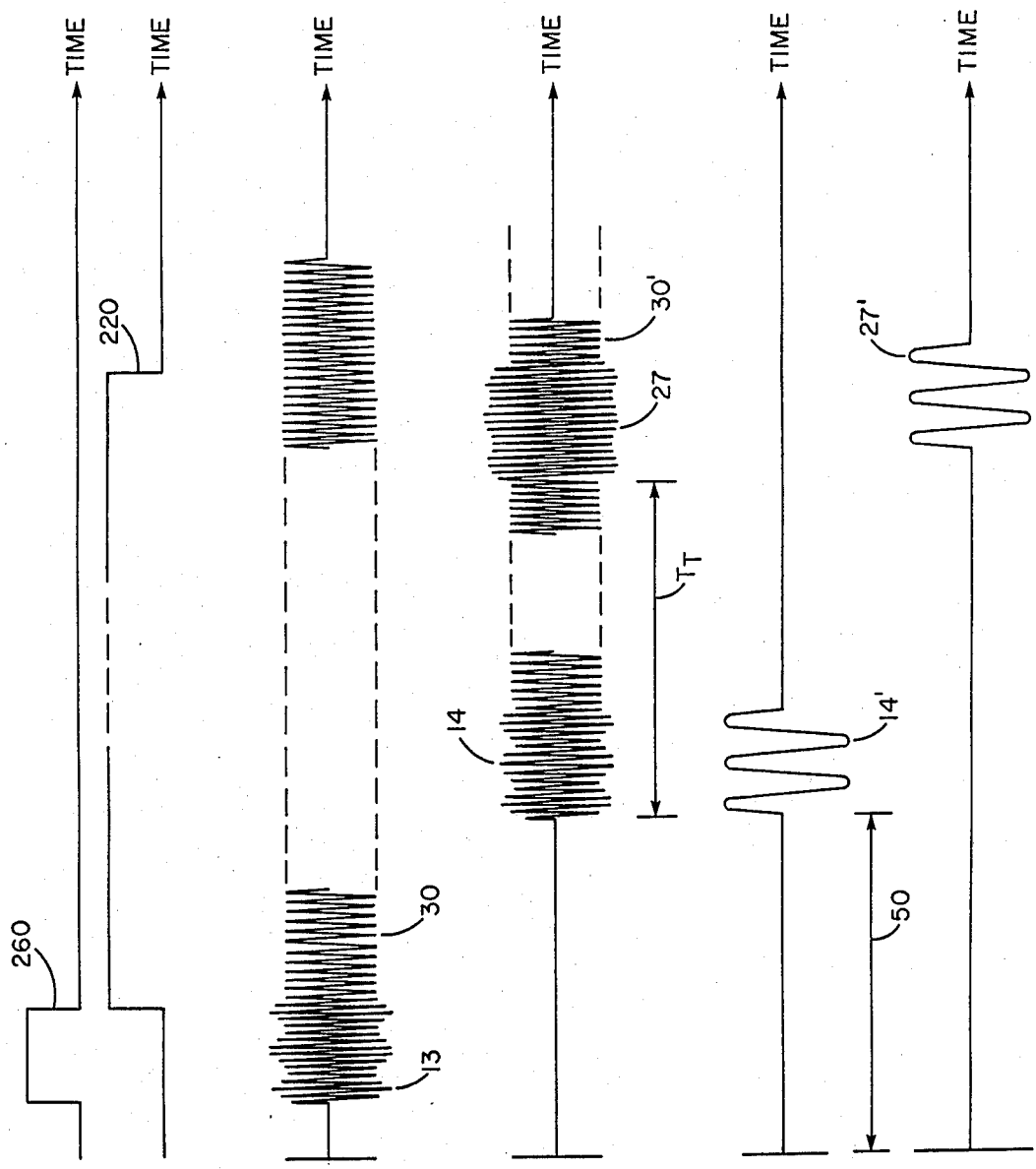
FIG. 3 is a signal timing diagram.

Referring to FIG. 2, there is shown a block diagram of a sonar system 30 of this invention. The transducer 11 referred to in the discussion of FIG. 1 is connected to a transmitter 21 and a dual AM/FM receiver 20 capable of providing an output signal for either an AM or an FM received signal. Transmitter 21 is amplitude modulated by the 10 KHz amplitude modulator 24 whose output is connected to transmitter 21 through gate 25. Gate 25 is activated by a pulse from pulse source 26 during which time the output of transmitter 21 is amplitude modulated with a 10 KHz signal. Typically, the duration of pulse 260 of FIG. 3 is 1 msec which is the approximate time for the 10 KHz signal 15 to travel through a 5-foot thick ice cap 14 and for the 10 KHz signal 15' reflected from the ice-air interface 16 to travel back through the ice cap to the water-ice interface 18. The duration of the pulse 260 and hence the duration of the AM transmission signal 13 is controllable by control 261 to cause the transmitted signal 13 to be optimally turned off at the time that the reflected 10 KHz signal 15' begins its return travel through the water 12.

At the termination of the pulse 260 of source 26, the pulse source 22 is activated to provide an energization pulse 220 to transmitter 21 which causes it to provide an unmodulated CW output signal 30, which need not have the same carrier frequency as the original transmission 13, to transducer 11 for the duration of a pulse 220. The amplitude modulated reflected signal 14 is detected by the AM portion of receiver 20 to provide the signal 14' at the output of filter 23. For reception of the FM signal 27 resulting from the interaction of signals 15', 30', the FM portion of receiver 20, connected to the transducer 11, provides an output signal 27' from a bandpass filter circuit 23 whose function is to narrow the bandwidth of the received signal to 2 KHz in order to filter the detected one millisecond 10 KHz modulated FM return signal resulting from the one millisecond duration of the amplitude modulated transmission signal 13. The distance below the ice cap 19 of the transducer 11 is assumed to be 100 meters which is sufficient distance to provide the interaction region for nonlinear interaction of the modulated signal 13 to parametrically produce adequate 10 KHz signal 15. The 10 KHz modulation frequency has been chosen somewhat arbitrarily with the following considerations. The parametric transmitting signal source level varies as 40 log W where W is the modulation frequency. Thus, the higher modulation frequency is desirable in order to increase the power level of the modulation (difference) frequency W as it enters the bottom of the ice cap 19. However, the attenuation in ice increases as the frequency W increases. Therefore, the 10 KHz modulation frequency has been chosen as typical in what is believed to be the optimal range of modulation frequencies. The power level of the transmitter 21 need only be in the vicinity of 40 watts in order to provide a detectable signal 27' from the ice-air interface 16 of ice cap 14.

The thickness D of the ice cap 19 is determined by the elapsed time, $T_T$, between the detected signals 14' and 27' divided by the product of the velocity of sound in ice, $C_{ICE}$, (1.6 milliseconds/meter) and two (to account for $T_T$ being the round-trip time through the ice), ($D = T_T / 2 C_{ICE}$).

FIG. 3 illustrates the transmit signals 13, 30 from transmitter 21, reflected signals 14, 30' and 27 received by the receiver 20, the detected AM signal 14', and the detected FM signal 27', all as a function of time. The depth of the transducer 11 below the water-ice interface 18 is represented by the elapsed time 50 from the time of transmission of signal 13 to the time of reception of the AM signal 14. The thickness of the ice cap 19 is proportional to the time $T_T$ between the received signals 14' and 27' by the relationship given in the preceding paragraph.

Having described a preferred embodiment of the invention, it will be apparent to one of skill in the art that other embodiments incorporating its concept may be used. It is believed, therefore, that this invention should not be restricted to the disclosed embodiment but rather should be limited only by the spirit and scope of the appended claims.

What is claimed is:

1. A method for measuring ice thickness comprising:
   generating in water an amplitude modulated sonic signal having a first carrier frequency and a modulating frequency;
   generating in water an unmodulated continuous wave transmission sonic signal at a second carrier frequency at the termination of said amplitude modulated sonic signal;
   said amplitude modulated signal nonlinearly interacting with said water to generated sonic energy at said modulating frequency, said modulating frequency propagating through an ice cap of said water and being reflected from an air-ice interface;
   detecting the reflected first carrier frequency with its modulating frequency reflected from the ice cap-water interface;
   said second carrier frequency signal also being reflected from the ice cap-water interface;
   said reflected modulating frequency and said reflected second carrier frequency nonlinearly interacting in said water to generate sidebands at said modulating frequency on each side of the second carrier to provide a frequency modulated second carrier frequency;
   detecting said frequency modulated second carrier frequency to detect the reflected modulating frequency from said air-ice interface; and
   measuring a time difference between reception of said detected first carrier frequency and said second carrier frequency thereby providing the thickness of said ice.

2. The method of claim 1 wherein:
   said first and second carrier frequencies are of the same frequency.

3. A method for measuring ice thickness comprising:

amplitude modulating a first carrier frequency at a modulation frequency to provide an amplitude modulated first carrier signal;

transmitting said amplitude modulated signal through water on the surface of which is an ice layer exposed to the air to form an air-ice interface;

transmitting a second carrier frequency signal through said water at the termination of said amplitude modulated signal;

said amplitude modulated signal nonlinearly interacting with said water to produce a modulation frequency sonic signal;

transmitting said modulation frequency sonic signal into said ice;

reflecting said modulation frequency sonic signal from the air-ice interface into said water where said modulation frequency sonic signal modulates said second carrier frequency;

detecting the modulating frequency of said amplitude modulated first carrier frequency signal reflected from said ice layer bottom;

detecting the modulating frequency of said modulated second carrier frequency signal reflected from the water-ice interface which has been modulated by the modulation frequency sonic signal reflected from said air-ice interface to provide the modulating frequency signal;

measuring a time between said detected modulating frequencies of said first and second carrier frequency signals to thereby determine the ice thickness.

4. The method of claim 3 wherein:

said reflected second carrier frequency is frequency modulated by said reflected modulation frequency sonic signal.

5. The method of claim 3 wherein:

said first and second carrier frequencies are the same frequency.

6. The method of claim 3 wherein:

said transmitting of said amplitude modulated signal is in the form of transmission of a pulse signal.

7. The method of claim 3 comprising in addition:

calculating said ice thickness from said time measuring and the speed of sound in ice.

8. Apparatus for measuring ice thickness comprising:

means generating in water an amplitude modulated sonic signal having a first carrier frequency and a modulating frequency;

means generating in water an unmodulated continuous wave transmission sonic signal at a second carrier frequency at the termination of said amplitude modulated sonic signal;

said second carrier frequency being reflected from an ice-water interface produced by ice on the surface of said water to produce a reflected second carrier frequency;

said amplitude modulated signal nonlinearly interacting with said water to generated sonic energy at said modulating frequency, said modulating frequency propagating through an ice cap of said water and being reflected from an air-ice interface;

means detecting a time of arrival of reflected first carrier frequency with its modulating frequency reflected from said ice-water interface;

said reflected modulating frequency from the air-ice interface and said reflected second carrier frequency from the ice-water interface nonlinearly interacting in said water to generate sidebands at said modulating frequency on each side of the second carrier to provide a frequency modulated second carrier frequency;

means detecting a time of arrival of said frequency modulated second carrier frequency to detect the reflected modulating frequency from said air-ice interface; and means measuring a time difference between said detected first and second carrier frequencies thereby providing the thickness of said ice.

9. The apparatus of claim 8 wherein:

said first and second carrier frequencies are of the same frequency.

10. A method for measuring ice thickness comprising:

generating in water a modulated sonic signal having a first carrier frequency and a modulating frequency;

generating in water an unmodulated continuous wave transmission sonic signal at a second carrier frequency;

said modulated signal nonlinearly interacting with said water to generated sonic energy at said modulating frequency, said modulating frequency propagating through an ice cap of said water and being reflected from an air-ice interface;

detecting the reflected first carrier frequency with its modulating frequency reflected from the ice cap-water interface;

said second carrier frequency signal also being reflected from the ice cap-water interface;

said reflected modulating frequency and said reflected second carrier frequency nonlinearly interacting in said water to generate a modulated second carrier frequency;

detecting said modulated second carrier frequency to detect the reflected modulating frequency from said air-ice interface; and measuring a time difference between reception of said detected modulated first carrier frequency and said detected modulated second carrier frequency thereby providing the thickness of said ice.

11. Apparatus for measuring ice thickness comprising:

means generating in water a modulated sonic signal having a first carrier frequency and a modulating frequency;

means generating in water an unmodulated continuous wave transmission sonic signal at a second carrier frequency;

said second carrier frequency being reflected from an ice-water interface produced by ice on the surface of said water to produce a reflected second carrier frequency;

said modulated signal nonlinearly interacting with said water to generated sonic energy at said modulating frequency, said modulating frequency propagating through an ice cap of said water and being reflected from an air-ice interface;

means detecting a time of arrival of reflected first carrier frequency with its modulating frequency reflected from the ice cap-water interface;

said reflected modulating frequency from the air-ice interface and said reflected second carrier frequency from said ice water interface nonlinearly interacting in said water to generate a modulated second carrier frequency;

means detecting a time of arrival of said modulated second carrier frequency to detect the reflected modulating frequency from said air-ice interface; and means measuring a time difference between said detected first and second carrier frequency modulations providing the thickness of said ice.

* * * * *